(12) United States Patent
Bird et al.

(10) Patent No.: US 8,864,181 B2
(45) Date of Patent: Oct. 21, 2014

(54) SPLIT-RING GLAND PIPE COUPLING WITH CORRUGATED ARMOR

(75) Inventors: Edwin A. Bird, Ashdown, AR (US); George D. Gabert, Texarkana, TX (US)

(73) Assignee: Sensus Spectrum, LLC, Raleigh, NC (US)

( * ) Notice: Subject to any disclaimer, the term of this patent is extended or adjusted under 35 U.S.C. 154(b) by 426 days.

(21) Appl. No.: 13/028,287

(22) Filed: Feb. 16, 2011

(65) Prior Publication Data

US 2012/0205909 A1    Aug. 16, 2012

(51) Int. Cl.
F16L 21/06    (2006.01)
F16L 19/00    (2006.01)
F16L 21/02    (2006.01)
F16L 21/08    (2006.01)
B23P 11/00    (2006.01)

(52) U.S. Cl.
CPC .............. *F16L 19/00* (2013.01); *F16L 21/022* (2013.01); *F16L 21/08* (2013.01); *B23P 11/00* (2013.01); *F16L 21/065* (2013.01)
USPC ............ 285/337; 285/111; 285/367; 285/369

(58) Field of Classification Search
USPC .................................................. 285/337, 367
See application file for complete search history.

(56) References Cited

U.S. PATENT DOCUMENTS

| 293,734 A | 2/1884 | Harrison |
|---|---|---|
| 703,657 A | 7/1902 | Horn |
| 2,165,926 A | 7/1939 | Greene |
| 2,206,262 A | 8/1939 | Olt |
| 2,269,664 A | 1/1941 | Hallerberg |
| 2,259,453 A | 10/1941 | Beyer et al. |
| 2,355,408 A | 8/1944 | Wyss |
| 2,491,004 A | 12/1949 | Graham |
| 2,541,205 A | 2/1951 | Christophersen |
| 2,741,497 A | 4/1956 | Risley |
| 2,766,054 A | 10/1956 | Everhart |
| 2,822,190 A | 2/1958 | Burke |
| RE24,651 E | 5/1959 | Anderson |
| 2,923,308 A | 2/1960 | Shohan |

(Continued)

FOREIGN PATENT DOCUMENTS

DE    1271473 B    6/1968

OTHER PUBLICATIONS

Five views of Hymax 16 Coupling (5 pages).

(Continued)

*Primary Examiner* — James Hewitt
(74) *Attorney, Agent, or Firm* — Wood, Herron & Evans, LLP

(57) ABSTRACT

A pipe coupling for coupling adjacent ends of a pair of pipes includes a sleeve, a split-ring gland positioned around one of the ends of the sleeve, and at least one annular gasket positioned within the split-ring gland and configured to be compressed by the split-ring gland for sealing one pipe end to the sleeve. The split-ring gland includes two partially circular gland members with spaced ends defining a gap. The pipe coupling includes an armor positioned to span the gap between the spaced ends to provide a generally closed annular periphery about the gasket. The armor includes a corrugated portion having a plurality of corrugations engaging the split-ring gland and the gasket during compression of the gasket. The armor is cold formed to improve structural strength and durability.

25 Claims, 7 Drawing Sheets

(56) References Cited

U.S. PATENT DOCUMENTS

| | | |
|---|---|---|
| 2,936,186 A | 5/1960 | Dunmire |
| 2,937,037 A | 5/1960 | Woolsey |
| 2,985,291 A | 5/1961 | Schoepe et al. |
| 2,999,699 A | 9/1961 | Lafferty |
| 3,029,946 A | 4/1962 | Wright, Jr et al. |
| 3,033,581 A | 5/1962 | Sims |
| 3,054,627 A | 9/1962 | Ligon |
| 3,059,941 A | 10/1962 | Kayno et al. |
| 3,124,367 A | 3/1964 | Kaynor |
| 3,135,519 A | 6/1964 | Ligon et al. |
| 3,150,876 A | 9/1964 | Lafferty |
| 3,233,907 A | 2/1966 | Stanton |
| 3,237,954 A | 3/1966 | Franklin |
| 3,250,538 A | 5/1966 | Albon |
| 3,298,698 A | 1/1967 | Condon |
| 3,315,970 A | 4/1967 | Holloway |
| 3,386,745 A | 6/1968 | Hein |
| 3,436,323 A | 4/1969 | Shimizu et al. |
| 3,485,515 A | 12/1969 | Frishof |
| 3,486,772 A | 12/1969 | Elsner |
| 3,510,139 A | 5/1970 | Potter |
| 3,519,283 A | 7/1970 | Tashlick et al. |
| 3,565,468 A * | 2/1971 | Garrett ............ 285/373 |
| 3,591,191 A | 7/1971 | Coderre et al. |
| 3,680,894 A | 8/1972 | Young |
| 3,700,008 A * | 10/1972 | Hackman ............ 138/99 |
| 3,724,878 A | 4/1973 | Ford |
| 3,727,951 A | 4/1973 | Shire et al. |
| 3,828,403 A | 8/1974 | Perrin et al. |
| 3,877,733 A | 4/1975 | Straub |
| 3,964,773 A | 6/1976 | Stade et al. |
| 4,026,586 A * | 5/1977 | Kennedy et al. ............ 285/236 |
| 4,116,473 A | 9/1978 | Creus |
| 4,163,571 A | 8/1979 | Nash |
| 4,362,323 A | 12/1982 | Lodder et al. |
| 4,380,348 A | 4/1983 | Swartz |
| 4,421,347 A | 12/1983 | Kantor |
| 4,471,979 A | 9/1984 | Gibb et al. |
| 4,480,860 A | 11/1984 | Foresta et al. |
| 4,538,841 A | 9/1985 | Royston |
| 4,606,565 A | 8/1986 | Royston |
| 4,611,835 A | 9/1986 | Gittleman |
| 4,645,244 A | 2/1987 | Curtis |
| 4,726,611 A | 2/1988 | Sauer |
| 4,824,148 A | 4/1989 | Grabowski |
| 4,842,306 A | 6/1989 | Zeidler et al. |
| 4,893,843 A | 1/1990 | DeRaymond |
| 4,966,395 A | 10/1990 | Hendrickson |
| 5,018,768 A | 5/1991 | Palatchy |
| 5,069,490 A | 12/1991 | Halen, Jr. |
| 5,203,594 A | 4/1993 | Straub |
| 5,257,834 A | 11/1993 | Zeidler et al. |
| 5,314,213 A | 5/1994 | Heister et al. |
| 5,375,943 A | 12/1994 | McCavour et al. |
| 5,383,496 A * | 1/1995 | Bridges et al. ............ 138/99 |
| 5,431,458 A | 7/1995 | Schaub et al. |
| 5,476,292 A | 12/1995 | Harper |
| 5,560,656 A | 10/1996 | Okamura et al. |
| 5,697,194 A | 12/1997 | Gignac et al. |
| 5,765,876 A * | 6/1998 | Bridges ............ 285/15 |
| 5,769,467 A * | 6/1998 | Bridges ............ 285/370 |
| 5,941,576 A | 8/1999 | Krausz |
| 6,125,603 A | 10/2000 | Amore |
| 6,131,265 A * | 10/2000 | Bird ............ 29/507 |
| 6,168,210 B1 | 1/2001 | Bird |
| 6,293,556 B1 | 9/2001 | Krausz |
| 6,364,372 B1 | 4/2002 | Marandi |
| 6,843,514 B2 | 1/2005 | Rex et al. |
| 7,243,955 B2 | 7/2007 | Krausz et al. |
| 7,249,790 B2 * | 7/2007 | Potts et al. ............ 285/420 |
| 7,384,078 B2 | 6/2008 | Cobb et al. |
| D600,326 S | 9/2009 | Gibb et al. |
| 7,654,586 B2 | 2/2010 | Krausz et al. |
| 7,712,796 B2 | 5/2010 | Gibb et al. |
| 7,789,434 B2 | 9/2010 | Nagle et al. |
| 7,921,536 B2 | 4/2011 | Dole |
| 7,997,626 B2 * | 8/2011 | Krausz et al. ............ 285/110 |
| 8,020,898 B2 * | 9/2011 | Ignaczak ............ 285/367 |
| 8,042,816 B2 | 10/2011 | Krausz et al. |
| 8,448,993 B2 | 5/2013 | Cumic et al. |
| 8,528,945 B2 | 9/2013 | Bird et al. |
| 2002/0109355 A1 | 8/2002 | Elliott |
| 2003/0062718 A1 | 4/2003 | Radzik |
| 2003/0085566 A1 | 5/2003 | Rex et al. |
| 2003/0122377 A1 | 7/2003 | Northrop et al. |
| 2006/0284420 A1 | 12/2006 | Dole |
| 2008/0029970 A1 | 2/2008 | Krausz et al. |
| 2008/0048444 A1 | 2/2008 | Porter et al. |
| 2008/0129048 A1 | 6/2008 | Nagle et al. |
| 2010/0314864 A1 | 12/2010 | Lemke et al. |
| 2011/0031737 A1 | 2/2011 | Krausz et al. |
| 2012/0098259 A1 | 4/2012 | Sarkisian et al. |
| 2013/0111732 A1 | 5/2013 | Bird et al. |
| 2013/0119616 A1 | 5/2013 | Gabert |
| 2013/0119658 A1 | 5/2013 | Bird et al. |
| 2013/0193685 A1 | 8/2013 | Bird et al. |

OTHER PUBLICATIONS

Smith Blair Net Price Book, Prices Effective Jun. 1, 1959 (3 pages).
Non-Final Office Action in corresponding U.S. Appl. No. 13/728,562 (Apr. 25, 2013) (10 pages).
Non-Final Office Action in corresponding U.S. Appl. No. 13/728,693 (Apr. 29, 2013) (17 pages).
U.S. Patent and Trademark Office, Final Office Action issued in corresponding U.S. Appl. No. 13/728,562 (Oct. 18, 2013) (10 pages).
U.S. Patent and Trademark Office, Non-final Office Action issued in corresponding U.S. Appl. No. 13/728,633 (Jan. 9, 2014) (17 pages).
United States Patent and Trademark Office, Final Official Action issued in corresponding U.S. Appl. No. 13/728,693 (Nov. 20, 2013) (27 pages).
United States Patent and Trademark Office, Notice of Allowance issued in corresponding U.S. Appl. No. 13/728,693 (Jan. 3, 2014) (10 pages).

* cited by examiner

SPLIT-RING GLAND PIPE COUPLING WITH CORRUGATED ARMOR

FIELD OF THE INVENTION

The present invention relates generally to pipe couplings and joints and, more particularly, to pipe couplings adapted to couple and seal adjacent ends of two pipe sections of the same or different diameters.

BACKGROUND OF THE INVENTION

Conventional pipe couplings for coupling and sealing adjacent ends of two pipe sections include a coupling sleeve or collar with each pipe end extending into a respective end of the coupling sleeve. A gasket is held adjacent each end of the sleeve overlying the pipe section. An annular flange or gland is associated with each gasket and end of the sleeve, and is tightened to draw down the gasket against the pipe end thus sealing the pipe coupling thereto. One pipe coupling is shown in prior U.S. Pat. No. 6,168,210 and utilizes continuous flanges that are coupled together via bolts spanning the sleeve. The flanges, sleeve ends, and gaskets have particular relationships that affect the seal and allow the coupling to work over a range of pipe sizes to compress the gaskets against the pipe ends as the flanges are drawn towards each other.

While the continuous flange type of pipe coupling is considered to be particularly advantageous, another style of pipe coupling is proposed in which each flange is provided by a split-ring gland that presents spaced apart confronting ends which can be drawn together with a bolt to close down on the associated gasket. As a consequence, it is not necessary to have bolts that span the sleeve, nor cause the glands to move towards each other. Instead, each end of the sleeve can be independently coupled to the respective pipe end.

In order to work over a range of pipe diameters, the split-ring gland is sized such that it circumscribes most of the circumference of the sleeve end and gasket, but not that portion in the gap defined between the spaced apart confronting ends. However, it is important that the gasket not be exposed radially out of that gap as it will then be a source of leakage and/or failure during installation. To that end, the split-ring gland type of pipe coupling includes a bridge plate or "armor" spanning the gap over the gasket and extending into the gland at each end of the armor. The armor is shaped to conform to the arc of the gland and gasket so as to, in effect, define a continuation of the gasket-confronting surface of the gland. Thus, as the gland is closed down, the gasket will shift and seat throughout the combined circumference of the gland and the armor in order to facilitate installation and create the desired seal.

SUMMARY OF THE INVENTION

The present invention in one aspect provides an improved armor for the split-ring gland type of pipe couplings. The conventional armor is cold formed of stainless steel and presents a generally flat, smooth surface to the outer periphery of the gasket. In accordance with the principles of the present invention, at least a portion of the gasket confronting surface is corrugated, i.e., it is provided a plurality of corrugations extending along the surface. The corrugations improve the performance of the armor and, unexpectedly, also enhances the assembly of the pipe coupling. In that regard, the corrugations are advantageously instilled by cold working and therefore provide both increased bending stiffness and tensile strength to the armor as compared to conventional armors.

Also, during installation with conventional armors, the gasket would tend to "bunch up" at the ends of the armor, making it difficult to properly install the pipe coupling. In fact, the gasket and possibly the armor might have to be heavily lubricated to facilitate the shifting of the gasket as the split-ring gland is compressed to help reduce the risk of bunching. But the lubrication further hampers installation as the components are more difficult to handle and can hold dirt and other debris to the parts which is undesirable. Moreover, bunching was not always avoided even with lubrication. Unexpectedly, the corrugations of the armor according to the present invention reduce or eliminate the tendency of the gasket to bunch up thereagainst and also allow the gasket to more readily shift as it is compressed by the gland. As a result, the need for lubrication may be reduced, if not eliminated, thus further facilitating installation of the split-ring gland type of coupling.

By virtue of the foregoing there is thus provided by this one aspect of the present invention an improved armor for the split-ring gland type of pipe couplings.

With some split-ring type of pipe couplings, the gland may be formed as a unitary ring, but must be made of sufficiently flexible material that the spaced apart ends at the gap can be stretched or pulled apart to open up the gap in order to fit the gland onto the flange end of the sleeve. That design presents various drawbacks. Another proposal is to instead couple the abutting ends of two gland members by a fastener extending parallel to the longitudinal axis of the gland so that the gland members may "scissor" thereabout to increase the spacing of the gap from its nominal size for purposes of mounting the gland to the flange end of the sleeve. While the scissoring approach may facilitate assembly, for example, while using desirably more rigid materials, the ability of the gland members to scissor presents its own drawbacks. To that end, and in accordance with a second aspect of the present invention, the split-ring gland of the present invention utilizes two gland members, but securely couples them along one side with a fastener oriented tangential to the gland members. As a consequence, more rigid materials may be used, but without the disadvantage of scissoring.

Further, some split ring type of pipe couplings utilize a gasket having a plurality of layers integrally connected to each other. The inner layer typically defines an opening adapted to receive small pipe ends therethrough. Where it is desired to couple to a larger pipe end than can fit through the inner layer opening, one or more of the layers may be torn off the gasket to increase the size of the opening through the gasket to accommodate that larger pipe. Situations arise where the smaller diameter opening provided by the inner layer(s) was desired. But the torn-off layer(s) cannot be reused necessitating that the gasket be discarded and replaced with an entirely new gasket. In accordance with a third aspect of the present invention, a gasket is provided that is comprised of two separate and reusably coupled layers. To that end, the gasket advantageously includes an outer gasket and an inner gasket including corresponding interdigitated surfaces adapted to reusably couple the outer gasket and the inner gasket. The inner gasket may be wider axially than the outer gasket such that the inner gasket includes lips that may be gripped for pulling the inner gasket interdigitations radially inwardly and away from the outer gasket interdigitations. The interdigitations may be symmetrical along an axial direction such that the inner gasket may be re-coupled with the outer gasket in a different orientation rotated 180 degrees from an original orientation of the inner gasket.

The foregoing and other advantages of the present invention will be apparent in light of the accompanying drawings and detailed description thereof.

BRIEF DESCRIPTION OF THE DRAWINGS

The accompanying drawings, which are incorporated in and constitute a part of this specification, illustrate an embodiment of the invention and, together with the general description of the invention given above and the detailed description of the embodiment given below, serve to explain the principles of the present invention.

DETAILED DESCRIPTION OF THE INVENTION

Figure 1:
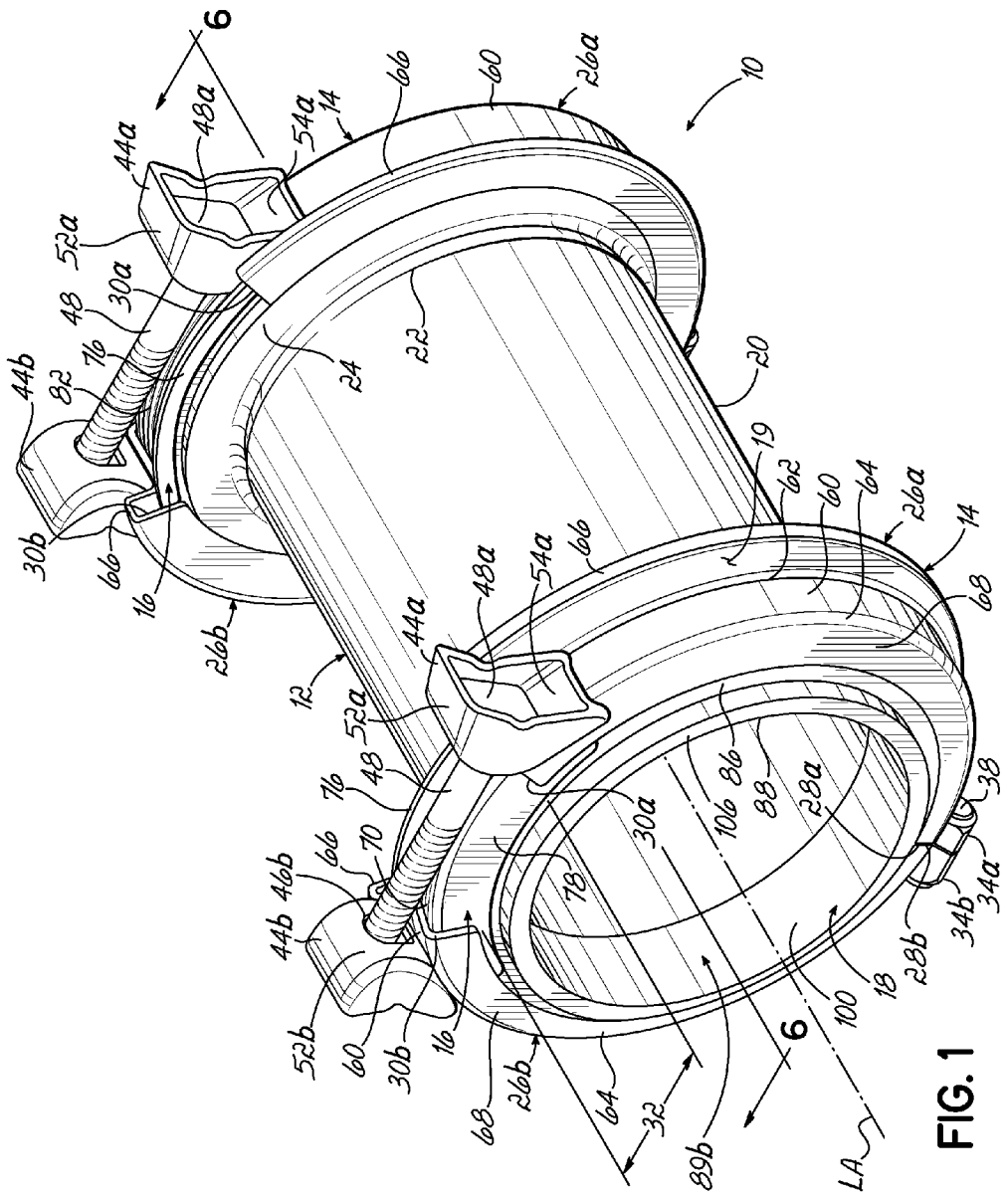
FIG. 1 is a perspective view of a pipe coupling utilizing armors in accordance with the principles of the present invention.
Figure 2:
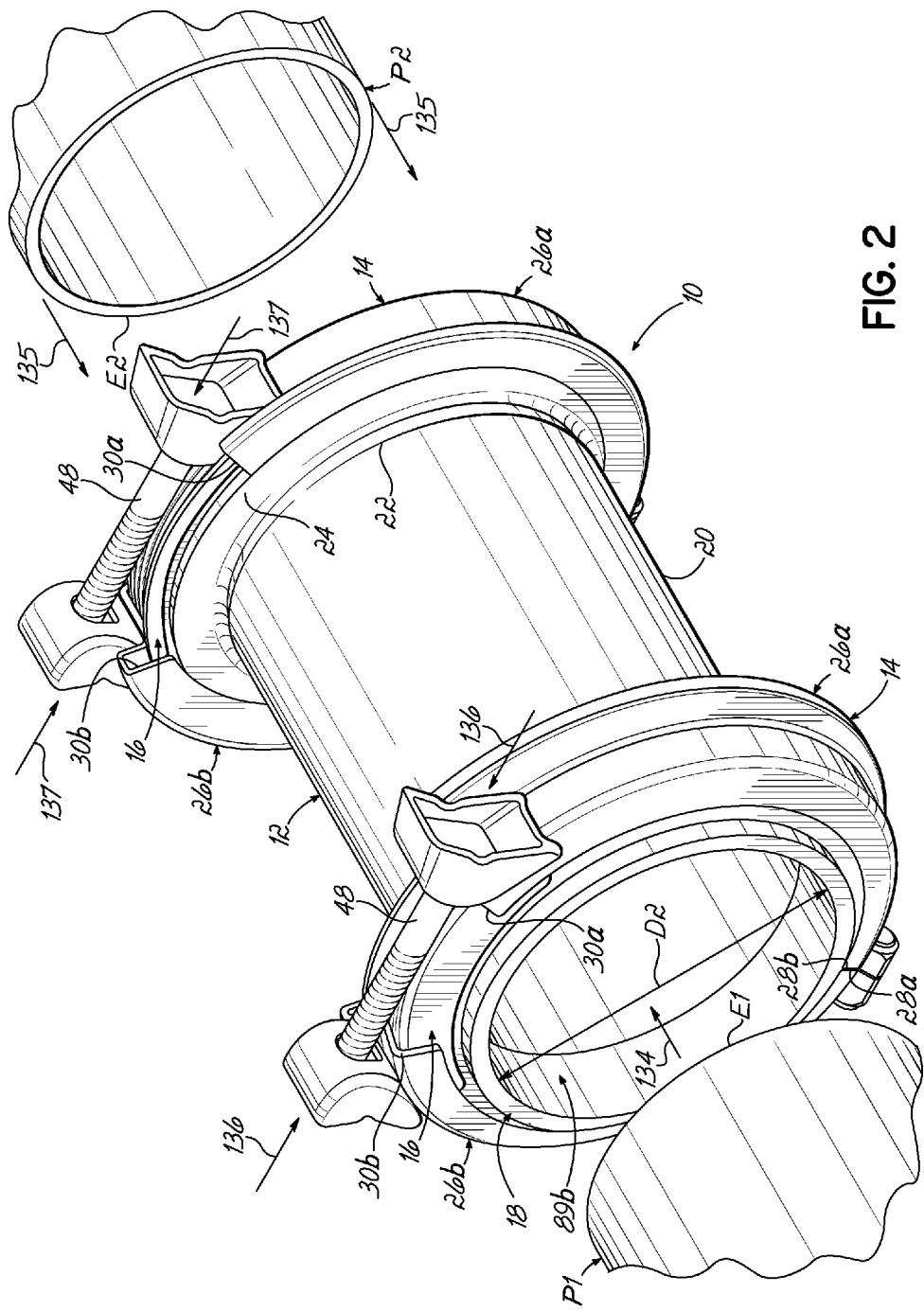
FIG. 2 is a perspective view of the pipe coupling of FIG. 1 for purposes of describing the use of the pipe coupling to sealingly couple two pipes in fluid communication.

With reference to FIGS. 1 and 2, a split-ring gland type of pipe coupling 10 according to one embodiment of the present invention is shown. The pipe coupling 10 includes a sleeve 12, a pair of split-ring glands 14, a bridge plate or armor 16 associated with each split-ring gland 14, and an annular gasket 18 associated with each split-ring gland 14. In the fully assembled state of the pipe coupling 10, an end E1 of a first pipe P1 is inserted into the sleeve 12 through one of the split-ring glands 14 and the corresponding gasket 18, and an end E2 of a second pipe P2 is inserted into the other split-ring gland 14 and associated gasket 18. The split-ring glands 14 are configured to be tightened onto the corresponding gaskets 18 to compress the gaskets 18 into sealing connection with the respective pipe ends E1, E2. The split-ring gland 14 and the armor 16 collectively define a generally closed annular periphery 19 around the gasket 18, which further ensures that fluid passing through the pipes P1, P2 and the pipe coupling 10 does not leak past the gasket 18 out of the pipe coupling 10. Thus, the pipe coupling 10 provides a sealed coupling of two adjacent pipe ends E1, E2 in fluid communication.

Figure 3:
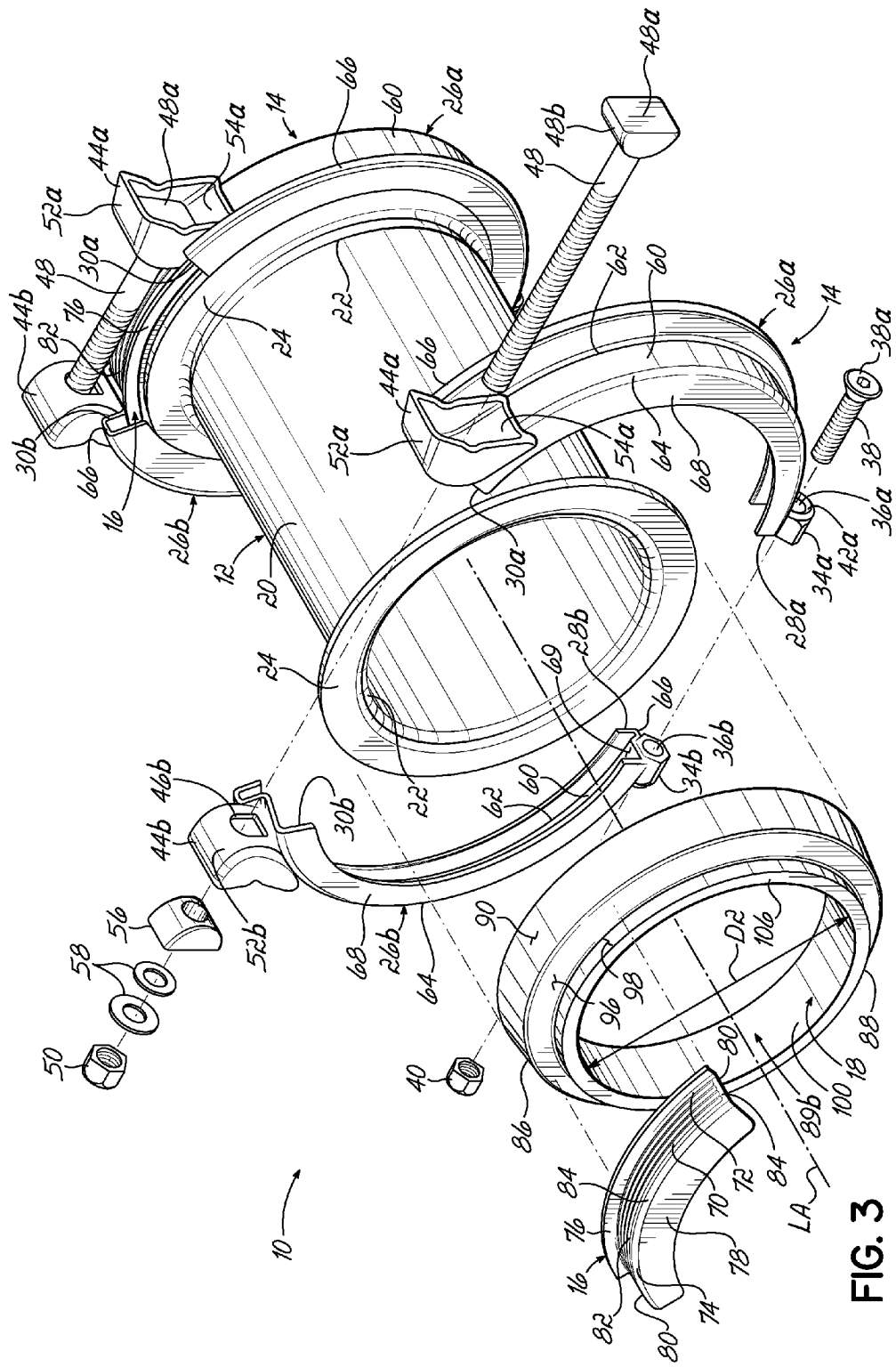
FIG. 3 is a partially-exploded perspective view of the pipe coupling of FIG. 1.

Further details of the components of the pipe coupling 10 are shown in FIG. 3, in which one of the split-ring glands 14 is shown partially exploded to facilitate discussion. The sleeve 12 includes a generally cylindrical body portion 20 defining a longitudinal axis LA of the pipe coupling 10 and having opposing open ends 22. At each of the opposing ends 22, the sleeve 12 further includes a radially outwardly-directed flange 24 that is used to accurately locate the split-ring gland 14 and the annular gasket 18, as described in further detail below. Although the sleeve 12 of the exemplary embodiment is shown as cylindrical, it will be understood that the body portion 20 of the sleeve may also be tapered slightly inwardly adjacent both open ends 22 to provide clearance for slight angles between the pipe ends E1, E2 to be coupled in fluid communication by the pipe coupling 10.

Each of the split-ring glands 14 includes a first partially-circular gland member 26a and a second partially-circular gland member 26b. The gland members 26a, 26b each define a half-moon shape and are configured to be centered about the longitudinal axis LA of the pipe coupling 10. The gland members 26a, 26b include respective abutting ends 28a, 28b and respective spaced ends 30a, 30b. The abutting ends 28a, 28b are configured to be securely coupled together in generally gap-free relationship as shown in FIG. 1. With the abutting ends 28a, 28b securely coupled, the spaced ends 30a, 30b define a nominal gap 32 therebetween. To this end, the abutting end 28a of the first gland member 26a includes a first abutting bolt flange 34a projecting radially outwardly from the abutting end 28a. Similarly, the abutting end 28b of the second gland member 26b includes a second abutting bolt flange 34b projecting radially outwardly from the abutting end 28b.

The first and second abutting bolt flanges 34a, 34b include corresponding apertures 36a, 36b oriented tangential to the axis LA and configured to receive a fastener, for example, the bolt 38 and nut 40 shown in FIG. 3. The bolt 38 extends through the apertures 36a, 36b and is coupled to nut 40, such that the bolt 38 and the nut 40 are also oriented generally tangential to the split-ring gland 14 in the illustrated embodiment of the pipe coupling 10. Consequently, when the bolt 38 and nut 40 securely couple the abutting ends 28a, 28b, the gland members 26a, 26b are restrained from pivotally rotating relative to each other thereat such that the ends 30a, 30b are restrained from scissoring apart beyond the nominal gap 32. The nominal gap 32 described above is thus generally considered the maximum length of gap of the split-ring gland 14. The first and second abutting bolt flanges 34a, 34b may be provided with opposing countersinks (only 42a shown in FIG. 3) facing away from one another and configured to receive the head 38a of the bolt 38 and the nut 40 generally flush with the structure of the first and second bolt flanges 34a, 34b. However, the first and second abutting bolt flanges 34a, 34b may be securely coupled by alternative fasteners or may include internal threading at the apertures 36a, 36b in other embodiments. Furthermore, the first and second abutting bolt flanges 34a, 34b may be modified to be plate-shaped or another appropriate flange shape as well understood in the art.

The first and second gland members 26a, 26b also include spaced bolt flanges 44a, 44b at the respective spaced ends 30a, 30b. The spaced bolt flanges 44a, 44b project radially outwardly from the spaced ends 30a, 30b of the first and second gland members 26a, 26b. The spaced bolt flanges 44a, 44b include corresponding apertures (only 46b shown in FIG. 3) configured to receive an adjustable fastener such as the elongate bolt 48 and nut 50 shown in FIG. 3. In this regard, the nut 50 may be tightened on the elongate bolt 48 to draw the spaced bolt flanges 44a, 44b and the spaced ends 30a, 30b closer together from the nominal position to a tightened position, to thereby compress the annular gasket 18 onto one of the pipe ends E1, E2. With the ends 28a, 28b secured together as described above, tightening of the nut 50 advantageously uniformly closes down the gland members 26a, 26b about the annular gasket 18. The elongate bolt 48 and nut 50 are oriented generally tangential to the split-ring gland 14 in the illustrated embodiment of the pipe coupling 10. It will be appreciated that the spaced bolt flanges 44a, 44b may be coupled by alternative known fasteners.

Each of the spaced bolt flanges 44*a*, 44*b* includes a convex arcuate surface 52*a*, 52*b* facing the gap 32 between the spaced ends 30*a*, 30*b* and a concave arcuate surface (only 54*a* shown in FIG. 3) facing away from the gap 32. The head 48*a* of the elongate bolt 48 includes an arcuate surface 48*b* configured to be received in the concave arcuate surface 54*a* of the first spaced bolt flange 44*a*. A spacer 56 disposed adjacent the nut 50 also includes an arcuate surface 56*a* configured to be received in the concave arcuate surface of the second spaced bolt flange 44*b*. Consequently, when the nut 50 is tightened on the elongate bolt 48, the engagement of the head 48*a* of the elongate bolt 48 with the first spaced bolt flange 44*a* and the engagement of the spacer 56 with the second spaced bolt flange 44*b* hold the elongate bolt 48 in position with respect to the split-ring gland 14. One or more plastic or metal washers 58 may also be provided between the spacer 56 and the nut 50.

The first and second gland members 26*a*, 26*b* each include a partially-cylindrical annular wall 60 with an inner edge 62 and an outer edge 64. The partially-cylindrical annular walls 60 are generally flat rather than concave in cross section. The first and second gland members 26*a*, 26*b* each further include an inwardly-directed U-shaped wall 66 at the inner edge 62 of the annular wall 60. The U-shaped walls 66 are configured to receive the flange 24 at the end 22 of the sleeve 12, thereby accurately locating the split-ring gland 14 on the sleeve 12. The first and second gland members 26*a*, 26*b* each also include an outer wall 68 extending inwardly in a radial direction at the outer edge 64. As described in further detail below, at least a portion of the annular gasket 18 is captured between the outer walls 68 and the flange 24 of the sleeve 12. Thus, the annular walls 60, the outer walls 68, and the flange 24 of the sleeve 12 collectively define a gasket seat 69 for the split-ring gland 14. In the exemplary embodiment shown, the split-ring gland 14 may be tightened between a minimum diameter of about 10.00 inches .+−.0.13 inch and a maximum diameter of about 10.81 inches .+−.0.25 inch. The sleeve 12 and the split-ring gland 14 are each formed from carbon steel in one embodiment, but these components may alternatively be formed from stainless steel, plastic, or another structural material.

Figure 4:
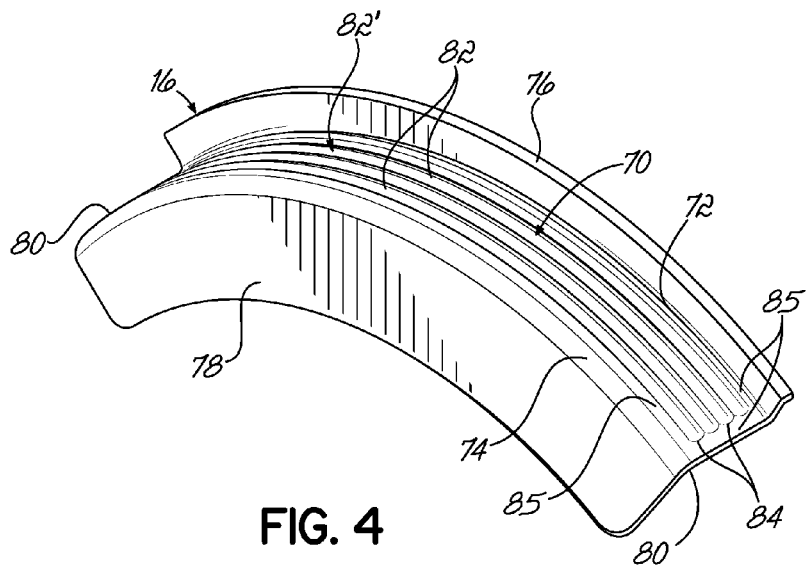
FIG. 4 is a perspective view of one of the armors of FIG. 1.

The armor 16 is more clearly shown in FIGS. 3 and 4. The armor 16 is generally S-shaped in cross section and has an arcuate shape along its length. The armor 16 includes a central wall 70 with an inner side edge 72 and an outer side edge 74. The armor 16 also includes an inner side wall 76 extending generally perpendicular to, and radially inwardly of, the central wall 70 at the inner side edge 72, and an outer side wall 78 extending generally perpendicular to, and radially outwardly of, the central wall 70 at the outer side edge 74. The inner side wall 76 and the outer side wall 78 extend in differing directions from the central wall 70 to form the generally S-shaped cross section of the armor 16. The central wall 70 further includes lateral side edges 80 extending from the inner side edge 72 to the outer side edge 74.

When the armor 16 is positioned at the gap 32 between the spaced ends 30*a*, 30*b* of the gland members 26*a*, 26*b*, the central wall 70 is positioned adjacent the annular walls 60 of the gland members 26*a*, 26*b* at the spaced ends 30*a*, 30*b*. To this end, the central wall 70 of the armor 16 defines an arc length that is at least long enough to span the gap 32 such that the lateral side edges 80 of the central wall 70 are disposed underneath the annular walls 60 of the gland members 26*a*, 26*b* in the nominal position of the split-ring gland 14. In this position, the inner side wall 76 projects into the U-shaped walls 66 of the gland members 26*a*, 26*b*, and the outer side wall 78 is positioned adjacent the outer walls 68 of the gland members 26*a*, 26*b* at the spaced ends 30*a*, 30*b*. Thus, the armor 16 and the split-ring gland 14 collectively define a closed ring or loop for receiving the annular gasket 18. More specifically, the central wall 70 of the armor 16 cooperates with the annular walls 60 of the gland members 26*a*, 26*b* to collectively define the generally closed annular periphery 19 for the annular gasket 18. In the exemplary embodiment, the armor 16 is configured to cover at least about 15% to about 30% and, advantageously, about 20% of the circumference of the gasket 18 when the gasket 18 is installed in the split-ring gland 14.

Shown most clearly in FIG. 4, the central wall 70 includes a plurality of corrugations 82 extending between the lateral side edges 80 and generally parallel to the inner and outer side edges 72, 74. Advantageously at least three or four such corrugations may be provided, although more or fewer may be provided depending on the width of the central wall 70 between the inner and outer side edges 72, 74. Furthermore, corrugations 82 advantageously extend radially outwardly from central wall 70, but could additionally or alternatively extend radially inwardly therefrom. In any event, the corrugations 82 may be seen as defining a corrugated portion 82' of the armor 16. The armor 16 may be formed by cold forming stainless steel, although the armor 16 may be formed in other ways. In that regard, at least corrugations 82 of the exemplary embodiment are advantageously instilled in the armor 16 by cold forming. The cold forming process provides increased structural strength for the armor 16, including increased tensile strength and work hardening. Furthermore, the corrugations 82 provide increased bending stiffness and an improved mechanical performance in the assembly of the pipe coupling 10. The corrugations 82 reduce the surface area of the central wall 70 that contacts the annular walls 60 of the split-ring gland 14 and the annular gasket 18. As such, the armor 16 more freely moves or slides with less friction against the split-ring gland 14 and the annular gasket 18 when the split-ring gland 14 is tightened to compress the annular gasket 18. In this regard, less lubrication or no lubrication is necessary between these components of the pipe coupling 10 in operation.

Corrugations 82 each advantageously taper as at 84 into the central wall 70 so as to stop short of either or both of the lateral side edges 80 and are also generally inboard of the inner and outer side edges 72, 74 so as to define one or more non-corrugated portions 85. The non-corrugated portions 85 extend inwardly from respective ones of the inner side edge 72, the outer side edge 74, and/or the lateral side edges 80 toward the corrugations 82. Where non-corrugated portions 85 are provided between each of the edges 72, 74, and 80, they cooperate to, in effect, define a frame about the corrugations 82. Advantageously, the corrugations 82 do not extend into one or both of the lateral side edges 80, such that the lateral side edge(s) 80 provide a linear edge for the armor 16 to confront and slide between the annular walls 60 of the split-ring gland 14 and the annular gasket 18. It will be appreciated, however, that working of the armor 16 to instill the corrugations 82 may cause some portions of the lateral side edge(s) 80 to distort. Moreover, the tapers 84 may extend into or against the lateral edge(s) 80 or the corrugations 82 may extend all the way to the lateral sides edge(s) 80. Unexpectedly, the inclusion of the corrugations 82, especially where they stop short of the lateral side edges 80, reduces the tendency of the elastomeric material of the annular gasket 18 to bunch up at the lateral side edges 80. Thus, the corrugations 82 significantly improve the performance of the armor 16 as compared to conventional, completely uncorrugated bridge plates or armors.

Figure 5:
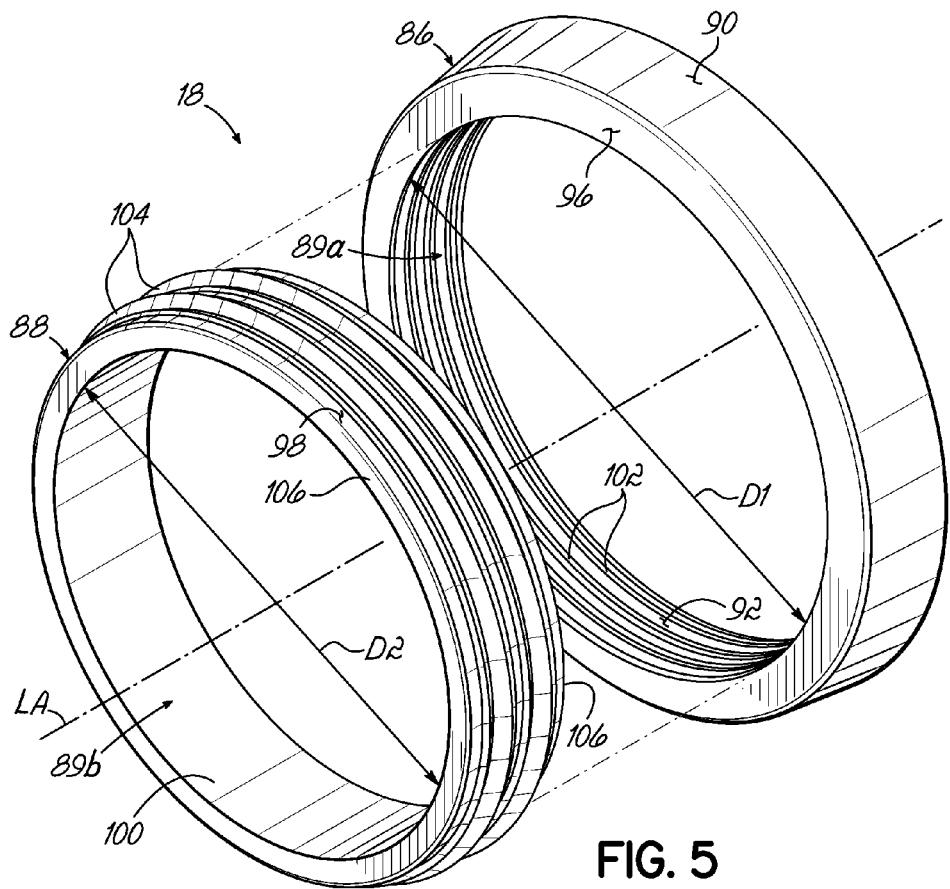
FIG. 5 is an exploded perspective view of a gasket used with the pipe coupling of FIG. 1.
Figure 6:
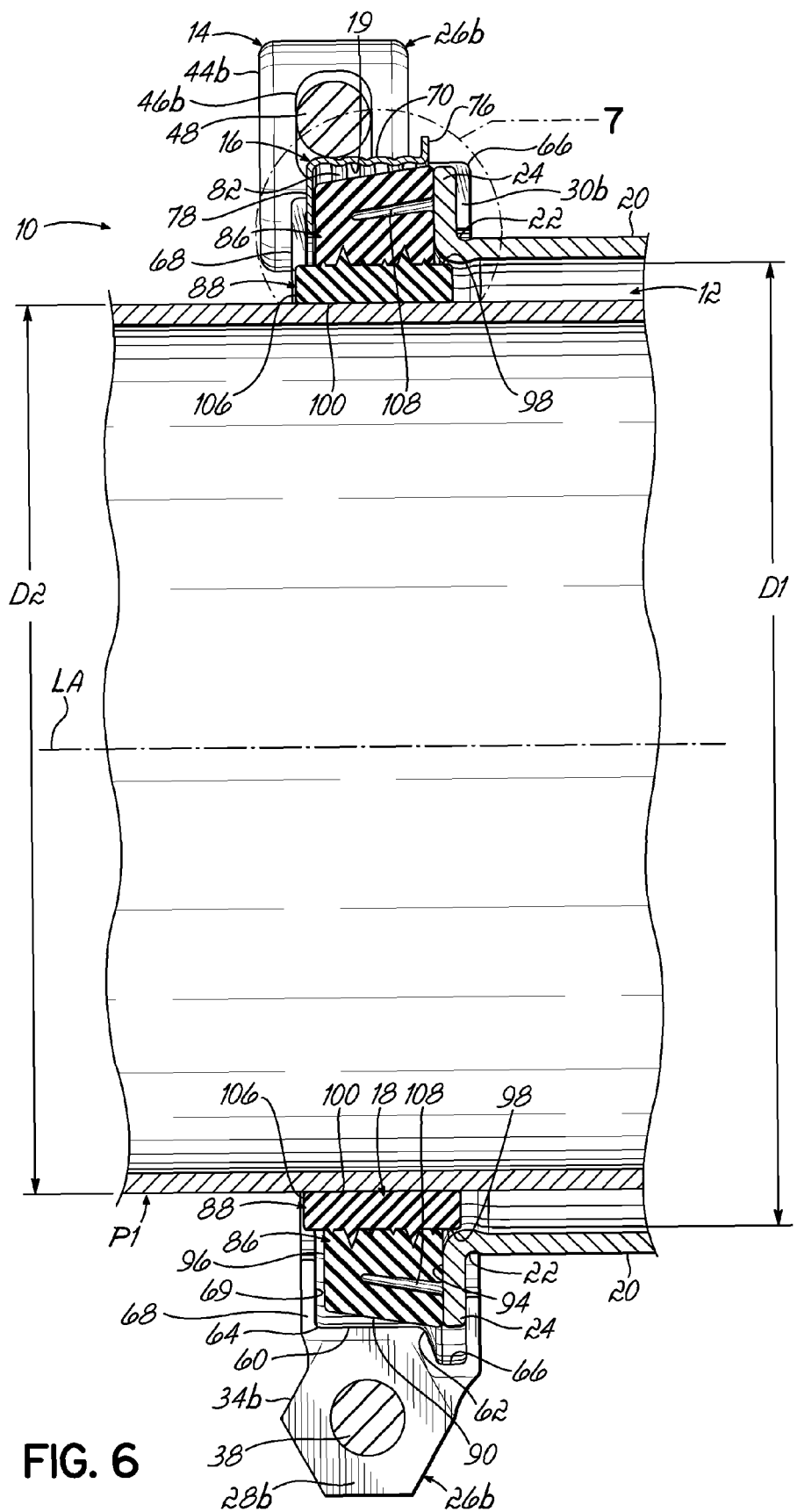
FIG. 6 is a partial cross-sectional view of one end of the pipe coupling of FIG. 1 taken along line 6-6 in FIG. 1 with one of the pipes of FIG. 2 inserted into the pipe coupling.
Figure 7:
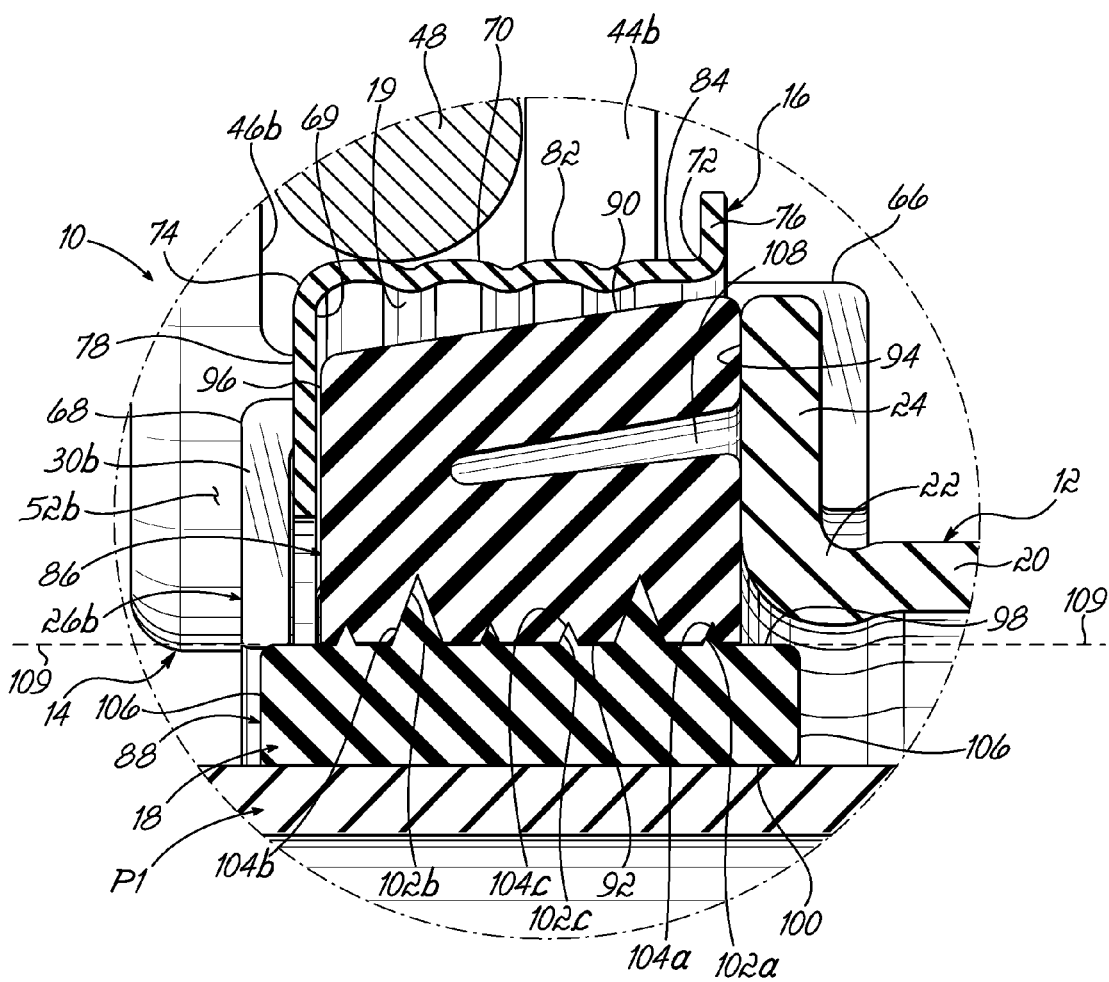
FIG. 7 is an enlarged partial cross-sectional view of one end of the pipe coupling and pipe of FIG. 6, showing details of the gasket and armor thereat.

The annular gasket 18 of the exemplary embodiment is further illustrated in FIGS. 5 through 7. The annular gasket 18 includes an annular outer gasket 86 and a separate annular inner gasket 88 reusably coupled to (i.e., repeatedly insertable into and removable from) the outer gasket 86. The annular gasket 18 defines a gasket opening 89b therethrough centered on the longitudinal axis LA when the pipe coupling 10 is assembled. Each of the outer gasket 86 and the inner gasket 88 is composed of an elastomeric material such as rubber. The outer gasket 86 is configured to engage the split-ring gland 14 and the armor 16 along an outer circumferential surface 90, and has an inner circumferential surface 92 configured to engage either the inner gasket 88 or the respective pipe end E1, E2 (when the inner gasket 88 is removed). The inner gasket 88 is configured to engage the pipe end E1, E2 inserted into the pipe coupling 10 and the inner circumferential surface 92 of the outer gasket 86 as will be described in greater detail below.

As shown most clearly in FIGS. 6 and 7, the outer gasket 86 includes the outer circumferential surface 90 facing the gland members 24a, 24b and the inner circumferential surface 92 facing the inner gasket 88 (or the respective pipe end E1, E2 when the inner gasket 88 is removed). The inner circumferential surface defines a first opening 89a (FIG. 5) having a diameter D1. The outer gasket 86 also includes an inner side surface 94 extending between the outer and inner circumferential surfaces 90, 92 and facing the sleeve 12, and an outer side surface 96 extending between the outer and inner circumferential surfaces 90, 92 and facing away from the sleeve 12. The outer circumferential surface 90 may be beveled such that the inner side surface 94 is longer than the outer side surface 96 to form a wedge-shaped configuration for the outer gasket 86. Similarly, the inner gasket 88 includes an outer circumferential surface 98 facing the outer gasket 86 and an inner circumferential surface 100 facing the pipe end E1, E2 or in an inward radial direction. The inner circumferential surface defines an opening 89b (FIG. 5) having a second, smaller diameter D2.

The inner gasket 88 may be selectively disengaged from the outer gasket 86 and removed from the pipe coupling 10 to modify an effective range of pipe outer diameters that may be sealed by and accommodated within the pipe coupling 10. In other words, the removable inner gasket 88 enables modification of an effective diameter of the pipe coupling 10 at the split-ring gland 14. For example, diameter D2 may allow the pipe coupling 10 to receive a pipe end E1 or E2 having an outer diameter (OD) in the range of 6.56 inches to 7.05 inches due to the presence of the inner gasket 88. However, removal of the inner gasket 88 leaves the opening 89a of diameter D1 which may allow the pipe coupling 10 to thus receive a pipe end E1 or E2 having an OD in the range of 7.05 inches to 7.65 inches. As will be appreciated, however, the diametrical dimensions and ranges of the split-ring gland 14 and the gasket 18 may be modified in other embodiments for pipes of different size ranges.

To facilitate reusable coupling of the inner gasket 88 to the outer gasket 86, the outer gasket 86 and the inner gasket 88 have corresponding interdigitated surfaces. More particularly, the inner circumferential surface 92 of the outer gasket 86 includes a plurality of first interdigitations 102 configured to engage a corresponding plurality of second interdigitations 104 formed on the outer circumferential surface 98 of the inner gasket 88. The engagement of the interdigitations 102, 104 discourages relative axial movement between the inner and outer gaskets 88, 86. The interdigitations 102, 104 are configured to be symmetrical such that the inner gasket 88 and the outer gasket 86 may be engaged without regard to orientation of the inner gasket 88. More specifically, the inner gasket 88 may be inserted into the outer gasket 86 in a first orientation along the longitudinal axis LA or a second orientation along the longitudinal axis LA wherein the inner gasket is reversed from the first orientation.

Also, because the outer gasket 86 and the inner gasket 88 are held together merely by the interdigitations 102, 104, the inner gasket 88 may be readily removed from and reinserted into the outer gasket 86 if the pipe end E1, E2 to be engaged by the annular gasket 18 has an OD within the smaller range provided above. For example, if a user (not shown) concludes that diameter D2 is too small for the intended pipe end E1 to be sealed by the pipe coupling 10, the inner gasket 88 may be removed by grabbing the inner gasket 88 along any side and pulling radially inwardly such that the interdigitations 102, 104 disengage along that side. The inner gasket 88 may then be pulled or torqued out of engagement with the remainder of the outer gasket 86 by pulling the partially-disengaged inner gasket 88 along the longitudinal axis LA out of the outer gasket 86. If, upon further examination, it is determined that diameter D1 is too large, and diameter D2 would actually suffice, the inner gasket 88 may be recoupled to the outer gasket 86 by reversing the steps described above.

In the illustrated embodiment, the first interdigitations 102 include several triangular cross-section annular grooves: two triangular-shaped shallow grooves 102a adjacent outer edges of the ring, two deeper triangular-shaped grooves 102b inboard of the outer shallow grooves 102a, and two additional triangular-shaped shallow grooves 102c inboard of the deeper grooves 102b. It will be appreciated that first interdigitations 102 may alternatively be formed with different shapes (i.e., circular), different depths (i.e., all grooves having a uniform depth), and with different numbers of grooves as opposed to the embodiment shown. In another alternative embodiment, the first interdigitations 102 may include a single concave smooth surface at the inner circumferential surface 92 of the outer gasket 86. Likewise, the second interdigitations 104 include several triangular cross-section annular projections 104a, 104b, 104c sized and positioned to mate with the shallow and deeper grooves forming the illustrated first interdigitations 102. It will be further appreciated that other types of projections or a single smooth concave surface could be provided for second interdigitations 104 to match the various alternatives described above for the first interdigitations 102. Alternatively, the first interdigitations 102 may be projections and the second interdigitations 104 may be grooves in other embodiments.

By positioning the inner gasket 88 within the outer gasket 86 with the projections 104 aligned with the grooves 102, the outer and inner gaskets 86, 88 are held together by their own resiliency, although the gaskets 86, 88 may be easily separated by pulling the inner gasket 88 inwardly in a radial direction and then away from the outer gasket 86. To this end, the inner gasket 88 is generally wider in an axial direction than the corresponding axial width of the outer gasket 86. The inner gasket 88 therefore includes lips 106 projecting beyond the inner and outer side surfaces 94, 96 of the outer gasket 86, the lips 106 facilitating easy gripping and movement of the inner gasket 88 inwardly radially away from the outer gasket 86 when the inner gasket 88 is to be removed from the pipe coupling 10.

The inner circumferential surface 100 of the inner gasket 88 is generally smooth or planar such that the inner gasket 88 provides a reliable seal on the pipe end E1 or E2 sized to work with diameter D2 and composed of various materials. However, the inner circumferential surface 100 may be provided with ribs, projections, or grooves similar to the interdigitations 102, 104 to provide an improved sealing connection with the pipe end E1 or E2 formed from semi-porous material such as cement. Similarly, with inner gasket 88 removed for use with the pipe end E1 or E2 sized to work with diameter D1, the first interdigitations 102 on the inner circumferential surface 92 of the outer gasket 86 may also improve the sealing connection with the pipe end E1 or E2 formed from semi-porous material. With any of these alternatives, the split-ring gland 14 is configured to be tightened sufficiently such that the inner gasket 88 or the outer gasket 86 forms a reliable seal around the corresponding pipe end E1, E2.

As shown in FIG. 7, the outer gasket 86 is configured to seat securely within the gasket seat 69 formed by the split-ring gland 14, the armor 16, and the flange 24 of the sleeve 12. In operation, the outer circumferential surface 90 of the outer gasket 86 seats against the annular walls 60 of the gland members 26a, 26b and the central wall 70 of the armor 16. The inner side surface 94 of the outer gasket 86 is positioned adjacent to the flange 24 of the sleeve 12, and the outer side surface 96 of the outer gasket 86 is positioned adjacent to the outer walls 68 of the gland members 26a, 26b and the outer side wall 78 of the armor 16. When the split-ring gland 14 compresses the outer gasket 86 inwardly, the outer gasket 86 seals the pipe coupling 10 from leakage adjacent the flange 24 of the sleeve 12 and adjacent the split-ring gland 14.

The outer gasket 86 may also include a nominally-open, nearly horizontal, annular slot 108 extending into the outer gasket 86 from the inner side surface 94 and towards the outer side surface 96. The slot 108 is advantageously continuous and angled at a shallow angle (e.g., 8.5°) from a plane 109 defined by the inner circumferential surface 92, and angled such that the slot 108 traverses radially inwardly as the slot 108 extends from the inner side surface 94 towards the outer side surface 96. The slot 108 is advantageously continuous and uninterrupted about the gasket opening 89b at the inner side surface 94. The slot 108 is positioned to aim towards the sleeve 12 and faces the corresponding flange 24 of the sleeve 12. Consequently, if pressurized fluid in the pipes P1, P2 begins to pass between the inner side surface 94 of the outer gasket 86 and the flange 24 on the sleeve 12, the pressurized fluid will enter the slot 108 and press outwardly on the outer gasket 86 at the slot 108. This additional force applied at the slot 108 further enhances the sealing connection of the outer gasket 86 to the split-ring gland 14, the armor 16, and the flange 24 of the sleeve 12. The angle and orientation of the slot 108 may be modified in other embodiments.

In the exemplary embodiment of the outer gasket 86 shown in FIG. 7, the slot 108 may have a length of approximately 0.75 inch when the outer gasket 86 has an axial width of 1.25 inches. The first interdigitations 102 or grooves may be spaced at regular 0.2 inch intervals and may define internal angles of about 40.degree. to 45.degree. Additionally, the radial thickness of the outer gasket 86 may be in the range of about 0.75 inch to 1.0 inch. The radial thickness of the inner gasket 88 may be about 0.25 inch to enable the differing pipe OD ranges described above. It will be understood that these exemplary dimensions may be modified for differing sizes of pipe ends E1, E2 and pipe couplings 10.

Figure 8:
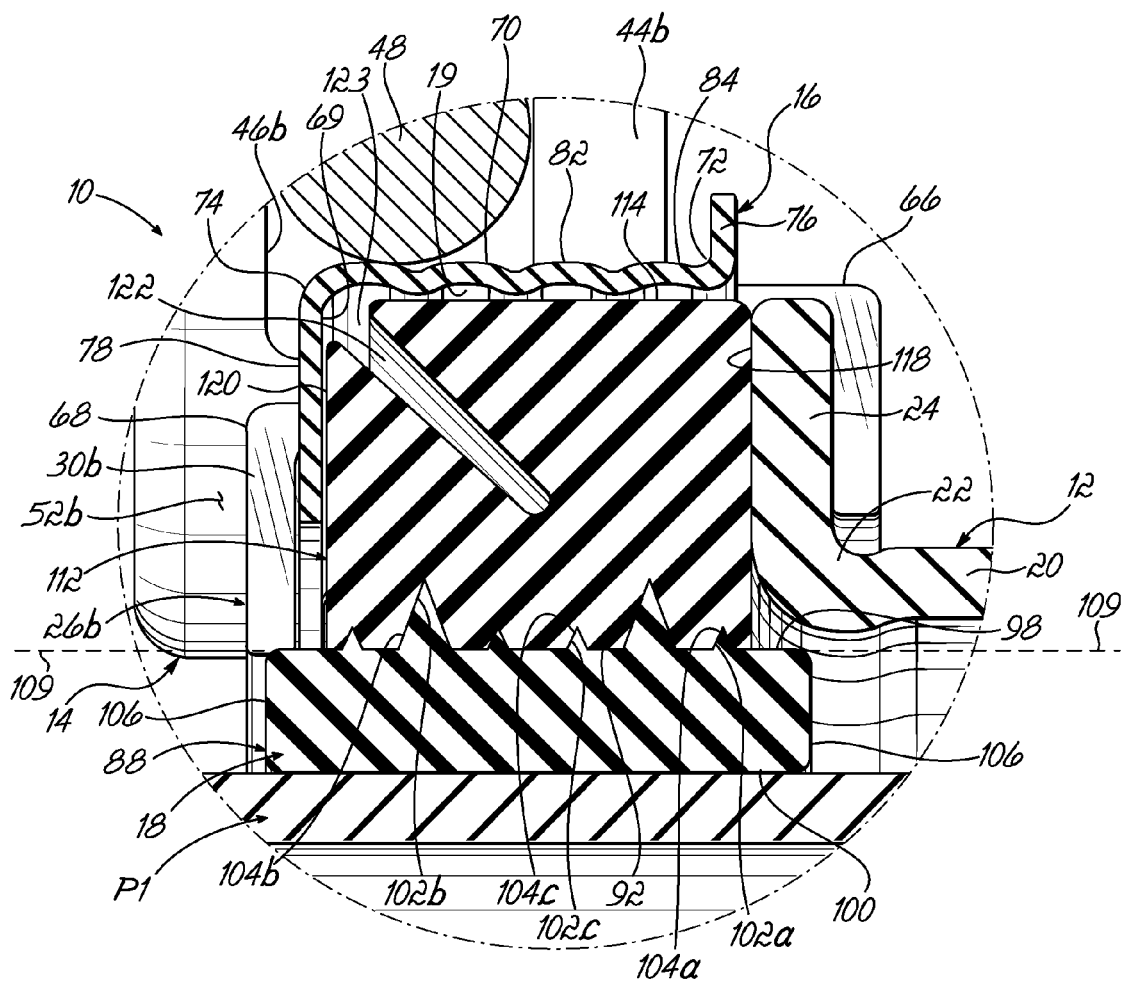
FIG. 8 is an enlarged partial cross-sectional view of one end of the pipe coupling and pipe of FIG. 6, including a different gasket configuration.

With reference to FIG. 8, another embodiment of an outer gasket 112 for use with the inner gasket 88 is shown. The outer gasket 112 of this embodiment again includes an outer circumferential surface 114, an inner circumferential surface 116, an inner side surface 118, and an outer side surface 120. Once again, the inner circumferential surface 116 includes the plurality of first interdigitations 102 to enable coupling with the inner gasket 88 as previously described. In contrast with the previous embodiment, the inner side surface 118 and the outer side surface 120 are of the same length such that the outer gasket 112 defines a generally rectangular shape. Additionally, the nearly horizontal slot 108 is omitted and an angled slot 122 is added. The angled slot 122 extends into the gasket 112 at the junction 123 between the outer circumferential surface 114 and the outer side surface 120 at about an angle of 45° from each of the outer circumferential surface 114 and the outer side surface 120. As the split-ring gland 14 is tightened, the gland members 26a, 26b tend to rotate slightly in cross section such that the outer side edge 120 of the outer gasket 112 is slightly more compressed than the inner side edge 118 of the outer gasket 112. The angled slot 122 utilizes this uneven compression to create a wedging action on the portion of the outer gasket 112 disposed inwardly from the angled slot 122, which thereby improves the sealing connection of the annular gasket 18. In all other regards, the outer gasket 112 of this embodiment operates similarly as the outer gasket 86 of the previous embodiment.

Although the angled slot 122 is angled at a relatively steep angle (e.g., 45°) from the outer circumferential surface 114, the angle and orientation of the slot 122 may be modified in other embodiments. In the embodiment of the outer gasket 112 shown in FIG. 8, the angled slot 122 may have a length of approximately 0.875 inches when the outer gasket 112 has an axial width of 1.25 inches. The first interdigitations 102 or grooves may be spaced at regular 0.2 inch intervals and may define internal angles of about 40° to 45°. Additionally, the radial thickness of the outer gasket 112 may be in the range of about 0.75 inches to 1.0 inch. It will be understood that these exemplary dimensions may be modified for differing sizes of pipe ends E1, E2 and pipe couplings 10.

To assemble the pipe coupling, two split-ring glands 14 are assembled with the armors 16 and the gaskets 18 on the opposing open ends 22 of the sleeve 12. For each of the split-ring glands 14, the two gland members 26a, 26b are brought together such that the U-shaped wall 66 of the split-ring gland 14 is engaged or seated onto the flange 24 at one open end 22 of the sleeve 12. The abutting ends 28a, 28b of the gland members 26a, 26b are securely coupled in gap free relationship with the bolt 38 and nut 40. Securely coupling the abutting ends 28a, 28b in this manner will provide a nominal gap 32 between the spaced ends 30a, 30b. The bolt 38 and nut 40 are oriented tangential to the gland members 26a, 26b and therefore restrain the gland members 26a, 26b from scissoring outwardly at the spaced ends 30a, 30b and increasing the length of the gap 32 from the nominal. The armor 16 is inserted to span the gap 32 between the spaced ends 30a, 30b of the gland members 26a, 26b and to form a generally closed annular periphery 19 with the gland members 26a, 26b. The annular gasket 18 is inserted into the closed annular periphery 19 of the armor 16 and the first and second gland members 26a, 26b. Alternatively, the armor 16 may be sitting on the gasket 18 and the gland members 26a, 26b may be brought together over the flange 24, the armor 16, and the gasket 18 simultaneously. In this position, the gasket 18 engages the corrugated portion 82 of the armor 16. The spaced ends 30a, 30b may be coupled by the elongate bolt 48 and nut 50. The elongate bolt 48 and nut 50 may be loosely engaged to leave the nominal gap 32 or, alternatively, may be tightened to begin compressing the gasket 18. The pipe coupling 10 may be packed and shipped in this assembled state in one embodiment.

Alternatively, each of the split-ring glands 14 may be assembled with the corresponding armor 16 and gasket 18 as described above without seating the U-shaped wall 66 of the split-ring gland 14 onto the flange 24 of the sleeve 12. In this assembly, the split-ring glands 14 may be shipped separately from the sleeve 12 and may be assembled with the sleeve 12 at a jobsite. The split-ring glands 14 will need to be loosened and mounted on the corresponding flanges 24 of the sleeve 12 at the jobsite in these embodiments. Any of the above-described assembly steps may be undone and repeated as required during installation and/or removal of the pipe coupling 10.

In use, the assembled pipe coupling 10 is operable to couple the pipe end E1 into fluid communication with the pipe end E2. With reference to FIG. 2, the pipe end E1 of the first pipe P1 is inserted through the gasket opening 89 of a first split-ring gland 14 and through one open end 22 into the sleeve 12 (arrow 134). The pipe end E2 of the second pipe P2 is inserted through the gasket opening 89 of a second split-ring gland 14 and through the other open end 22 into the sleeve 12 (arrow 135). The elongate bolt 48 and nut 50 of the first split-ring gland 14 are tightened to shorten the gap 32 between the spaced ends 30a, 30b thereof (arrows 136) and thereby generally uniformly compress the corresponding annular gasket 18 into sealed engagement with the first pipe P1. The elongate bolt 48 and nut 50 of the second split-ring gland 14 are tightened to shorten the gap 32 between the spaced ends 30a, 30b thereof (arrows 137) and thereby generally uniformly compress the corresponding annular gasket 18 into sealed engagement with the second pipe P2. Each pipe P1, P2 may be inserted into the sleeve 12 prior to tightening the split-ring glands 14, or one pipe (e.g., P1) may be inserted and tightened into position before the other pipe (e.g., P2) is inserted and tightened into position. Advantageously, the corrugations 82 of the armors 16 reduce the frictional engagement of the armors 16 with the corresponding annular gaskets 18 as the gaskets 18 are compressed. Thus, the annular gaskets 18 do not tend to bunch up on the armors 16 even with minimal lubrication in the split-ring glands 14.

In some applications, the first pipe P1 may be of a smaller diameter than the second pipe P2. To accommodate the larger diameter pipe (e.g., P2), the inner gasket 88 of the annular gasket 18 may need to be removed. The corresponding interdigitations 102, 104 of the inner gasket 88 and the outer gasket 86 are disengaged from each other so that the inner gasket 88 may be removed from the split-ring gland 14. More particularly, the inner gasket 88 is pulled radially inwardly away from the outer gasket 86 along any side so that the corresponding interdigitations 102, 104 are disengaged thereat. The inner gasket 88 may then be pulled along the longitudinal axis LA to torque the remainder of the interdigitations 102, 104 out of engagement as the inner gasket 88 moves away from the outer gasket 86. The larger pipe P2 may be inserted through the gasket opening 89 defined by the outer gasket 86 and through the open end 22 of the sleeve 12, and the corresponding split-ring gland 14 may tightened the outer gasket 86 into sealing engagement with the larger pipe P2. If a larger pipe is to be replaced with a smaller pipe, or if it is determined that the larger pipe is not so large as to seal into just the outer gasket 86, the inner gasket 88 may be re-inserted back into the outer gasket 86 by reversing the disengagement steps described above to accommodate the smaller diameter. The inner gasket 88 may be inserted back into the outer gasket 86 in the original orientation or in a reversed orientation along the longitudinal axis LA of the pipe coupler 10 because the corresponding interdigitations 102, 104 are symmetrical. Each of these steps may be repeated to use the pipe coupling 10 on pipes P1, P2 of different sizes.

By virtue of the foregoing, there are thus provided an improved armor, an improved gland, and/or an improved annular gasket for the split-ring gland type of pipe couplings in accordance with various aspects of the present invention.

While the present invention has been illustrated by the description of embodiments thereof, and while the embodiments have been described in considerable detail, it is not intended to restrict or in any way limit the scope of the appended claims to such detail. Additional advantages and modifications will readily appear to those skilled in the art. For example, an improved armor in accordance with the principles of the first aspect of the present invention may be used with the improved gland and/or improved annular gasket, but could also be used with other glands or gaskets. Moreover, each of the improved gland and the improved annular gasket in accordance with other aspects of the present invention may be used independently of each other. By way of further example, the armor and/or the corrugations 82 may be formed by hot working instead of cold working as will be appreciated by those skilled in the art. In regard to the gaskets, a generally solid outer gasket with no angled slots may be provided in other embodiments of the pipe coupling. Further, only a single gasket rather than a gasket 18 comprised of inner and outer gaskets, may be used. Additionally, the abutting ends 28a, 28b of the gland members 26a, 26b may be attached in other ways, including with a longitudinal bolt or the like, although scissoring of the gland members 26a, 26b may result. Further, while shown as being used to couple two pipe ends via the sleeve sleeve 12, only one end thereof might be provided with the split-ring glands 14, armor 16, and/or gasket 18. The invention in its broader aspects is, therefore, not limited to the specific details, representative apparatus and method, and illustrative examples shown and described. Accordingly, departures may be made from such details without departing from the spirit or scope of the general inventive concept.

Having described the invention, what is claimed is:

1. An armor configured to span a gap between spaced ends of a split-ring gland of a pipe coupling, comprising:
   a central wall having an arcuate shape, the central wall including an inner side edge, an outer side edge, and a plurality of corrugations extending along the central wall between the inner and outer side edges, the corrugations extending from the central wall to define radially inward aspects relative to the central wall and radially outward aspects relative to the central wall, wherein the corrugations are positioned along the central wall adjacent to one another so as to define a corrugated portion having abutting corrugations;
   a first side wall extending generally perpendicular to and in a first direction relative to the central wall at the outer side edge; and
   a second side wall extending generally perpendicular to and in a second direction opposite said first direction relative to the central wall at the inner side edge.

2. The armor of claim 1, the armor being cold formed.

3. The armor of claim 1, the armor being hot formed.

4. The armor of claim 1, the corrugations of the armor being cold formed.

5. The armor of claim 1, the central wall further including lateral side edges extending between the inner side edge and the outer side edge.

6. The armor of claim 5, the central wall further including a non-corrugated portion between at least one of the lateral side edges and the corrugations.

7. The armor of claim 5, the central wall further including non-corrugated portions between the lateral side edges and the corrugations.

8. The armor of claim 5, the central wall further including a non-corrugated portion between the corrugations and the lateral side edges, the inner side edge, and the outer side edge, whereby to frame the corrugations.

9. A pipe coupling for sealingly coupling to a pipe end, comprising:

a sleeve having a generally cylindrical body portion with open opposing ends;

a split-ring gland configured to be positioned around one of the ends of the sleeve and said pipe, the split-ring gland including two partially-circular gland members with abutting ends securely coupled along one side of the split-ring gland and spaced ends along another side of the split-ring gland, the spaced ends defining a gap which is adjustable in length by a first fastener coupling the spaced ends, each gland member further including a partially-cylindrical annular wall;

an armor positioned to span the gap between the spaced ends, the armor including a central wall extending from the annular walls of the gland members and having an arcuate shape and cooperating with the annular walls of the gland members to define a generally closed annular periphery, the central wall including an inner side edge, an outer side edge, and corrugations extending along the central wall between the inner and outer side edges, the corrugations extending from the central wall to define radially inward aspects relative to the central wall and radially outward aspects relative to the central wall, the radially outward aspects engaging the annular walls of the gland members, wherein the corrugations of the armor are positioned along the central wall adjacent to one another so as to define a corrugated portion having abutting corrugations, the armor further including a first side wall extending generally perpendicular to and in a first direction relative to the central wall at the outer side edge and a second side wall extending generally perpendicular to and in a second direction opposite said first direction relative to the central wall at the inner side edge; and at least one annular gasket including a gasket opening adapted to receive said pipe end, the annular gasket positioned within the closed annular periphery defined by the split-ring gland and the armor and such that the radially inward aspects of the corrugations on the armor engage the at least one annular gasket, the annular gasket being radially inwardly compressible by the split-ring gland to seal said pipe end to the pipe coupling as the first fastener shortens the gap between the spaced ends of the gland members.

10. The pipe coupling of claim 9, the armor being cold formed.

11. The pipe coupling of claim 9, the armor being hot formed.

12. The pipe coupling of claim 9, the corrugations of the armor being cold formed.

13. The pipe coupling of claim 9, the central wall of the armor further including lateral side edges extending between the inner side edge and the outer side edge, the central wall of the armor further including a non-corrugated portion between at least one of the lateral side edges and the corrugations.

14. The pipe coupling of claim 13, the central wall of the armor further including non-corrugated portions between both of the lateral side edges and the corrugations.

15. The pipe coupling of claim 9, the central wall of the armor further including lateral side edges extending between the inner side edge and the outer side edge, and a non-corrugated portion between the corrugations and the lateral side edges, the inner side edge, and the outer side edge, whereby to frame the corrugations.

16. The pipe coupling of claim 9, the sleeve including an outwardly-directed flange at one of the opposing ends, each gland member further including an inwardly-directed U-shaped wall at an inner edge of the annular wall and an outer wall extending radially inwardly at an outer edge of the annular wall, and the annular gasket being at least partially disposed between the flange of the sleeve and the outer wall.

17. The pipe coupling of claim 9, wherein the at least one annular gasket includes an annular outer gasket engaging the split-ring gland and the armor and defining an opening of a first diameter, and a separate annular inner gasket removably engaging the outer gasket and defining an opening of a second, smaller diameter, the inner and outer gaskets being configured to be reusably coupled whereby to accommodate pipe ends of different diameters.

18. The pipe coupling of claim 17, the outer gasket and the inner gasket each include corresponding triangular shaped interdigitated surfaces configured to prevent relative axial movement between the outer gasket and the inner gasket.

19. The pipe coupling of claim 17, the outer gasket and the inner gasket each include corresponding interdigitated surfaces configured to prevent relative axial movement between the outer gasket and the inner gasket, the corresponding interdigitated surfaces including symmetrical interdigitations along a longitudinal axis of the pipe coupling such that the inner gasket is engageable with the outer gasket in a first orientation defined along the longitudinal axis and in a second orientation along the longitudinal axis wherein the inner gasket is reversed from the first orientation.

20. The pipe coupling of claim 17, wherein the outer gasket and the inner gasket each include corresponding interdigitated surfaces configured to prevent relative axial movement between the outer gasket and the inner gasket, the inner gasket having a first axial width longer than a second axial width of the outer gasket, the additional axial width forming a lip on the inner gasket that projects beyond the outer gasket.

21. The pipe coupling of claim 9, the at least one annular gasket including an outer circumferential surface engaging the split-ring gland and the armor, an inner circumferential surface, and an inner side surface extending between the outer circumferential surface and the inner circumferential surface and directed toward the sleeve, the inner side surface further including an angled slot facing the sleeve.

22. The pipe coupling of claim 9, the at least one annular gasket including an outer circumferential surface engaging the split-ring gland and the armor, an inner circumferential surface, and an outer side surface extending between the outer circumferential surface and the inner circumferential surface and directed away from the sleeve, the gasket further including an angled slot extending into the gasket from a junction of the outer circumferential surface and the outer side surface.

23. The pipe coupling of claim 9, wherein the gland members include corresponding abutting bolt flanges at the abutting ends thereof, and a second fastener defining a second fastener longitudinal axis, the abutting bolt flanges including apertures oriented tangential to the gland members and configured to receive the second fastener securely coupling the abutting ends of the gland members in a gap-free relationship and such that the gap is formed between the spaced ends of the gland members, the second fastener being oriented to extend within a common plane with the spaced ends and the abutting ends of the gland members and to be positioned tangential to the partially-circular shape of the gland members within the common plane whereby to restrain the gland members from scissoring outwardly at the abutting ends, and the first and second fastener longitudinal axes are substantially parallel to one another.

24. The armor of claim 1, wherein the first direction is radially outwardly from the central wall and the second direction is radially inwardly from the central wall.

25. The pipe coupling of claim 9, wherein the first direction is radially outwardly from the central wall and the second direction is radially inwardly from the central wall.

* * * * *